(12) United States Patent
Nishina et al.

(10) Patent No.: US 7,499,814 B2
(45) Date of Patent: Mar. 3, 2009

(54) APPARATUS FOR DETECTING CONCENTRATION AND REMAINING AMOUNT OF LIQUID REDUCING AGENT

(75) Inventors: Mitsuhiro Nishina, Ageo (JP); Hiroyuki Kurita, Ageo (JP); Toshikazu Katou, Ageo (JP)

(73) Assignee: Nissan Diesel Motor Co., Ltd., Ageo-shi (JP)

( * ) Notice: Subject to any disclaimer, the term of this patent is extended or adjusted under 35 U.S.C. 154(b) by 0 days.

(21) Appl. No.: 10/575,476

(22) PCT Filed: Sep. 6, 2004

(86) PCT No.: PCT/JP2004/012939

§ 371 (c)(1),
(2), (4) Date: Dec. 4, 2006

(87) PCT Pub. No.: WO2005/042936

PCT Pub. Date: May 12, 2005

(65) Prior Publication Data

US 2007/0204677 A1 Sep. 6, 2007

(30) Foreign Application Priority Data

Oct. 31, 2003 (JP) ............................. 2003-373535

(51) Int. Cl.
*G06F 19/00* (2006.01)
(52) U.S. Cl. ....................................................... 702/50
(58) Field of Classification Search ................... 702/23, 702/25, 50, 55
See application file for complete search history.

(56) References Cited

U.S. PATENT DOCUMENTS

| 3,817,274 | A | 6/1974 | Anderson |
| 6,343,467 | B1* | 2/2002 | Muto et al. .................... 60/285 |
| 2005/0011183 | A1 | 1/2005 | Ripper et al. |
| 2007/0075467 | A1* | 4/2007 | Osaku et al. ................... 266/81 |
| 2007/0113544 | A1* | 5/2007 | Nishina et al. ................. 60/286 |
| 2007/0204678 | A1* | 9/2007 | Nishina et al. .............. 73/53.01 |
| 2007/0209428 | A1* | 9/2007 | Nishina et al. .............. 73/61.76 |

FOREIGN PATENT DOCUMENTS

| EP | 1 210 968 A1 | 6/2002 |
| EP | 1 688 598 | * 9/2006 |
| JP | 04-282433 | 10/1992 |

(Continued)

*Primary Examiner*—Michael P Nghiem
(74) *Attorney, Agent, or Firm*—McDermott Will & Emery LLP

(57) ABSTRACT

In a storage tank for storing a liquid reducing agent, a sensor for outputting a signal related to a concentration and a remaining amount of the liquid reducing agent based on a heat transfer characteristic between two points at a distance from each other is disposed. In a control unit which contains a built-in computer, it is determined that a vehicle state is stable when a stop time for which a vehicle is continuously in a stationary state reaches a predetermined determination time, the concentration of the liquid reducing agent is calculated based on the signal from the sensor when the vehicle state is stable, and the remaining amount of the liquid reducing agent is determined based on the signal from the sensor irrespective of the vehicle state, in response to a measurement trigger output every predetermined time after a start of an engine.

8 Claims, 8 Drawing Sheets

FOREIGN PATENT DOCUMENTS

| | | |
|---|---|---|
| JP | 2000-027627 | 1/2000 |
| JP | 2001-020724 | 1/2001 |
| JP | 2002-508466 | 3/2002 |
| JP | 2002-513109 | 5/2002 |
| JP | 2002-527660 | 8/2002 |
| JP | 2002-370016 | 12/2002 |
| JP | 2002-371831 | 12/2002 |
| JP | 2004-517336 | 6/2004 |
| JP | 2004-257325 | 9/2004 |
| JP | 2005-30888 | 2/2005 |
| WO | WO99/30810 | 6/1999 |
| WO | WO 99/55445 | 11/1999 |
| WO | WO 00/21881 | 4/2000 |
| WO | WO 02/27280 | 4/2002 |
| WO | WO 02/057603 | 7/2002 |
| WO | WO 2005/005971 | 1/2005 |

\* cited by examiner

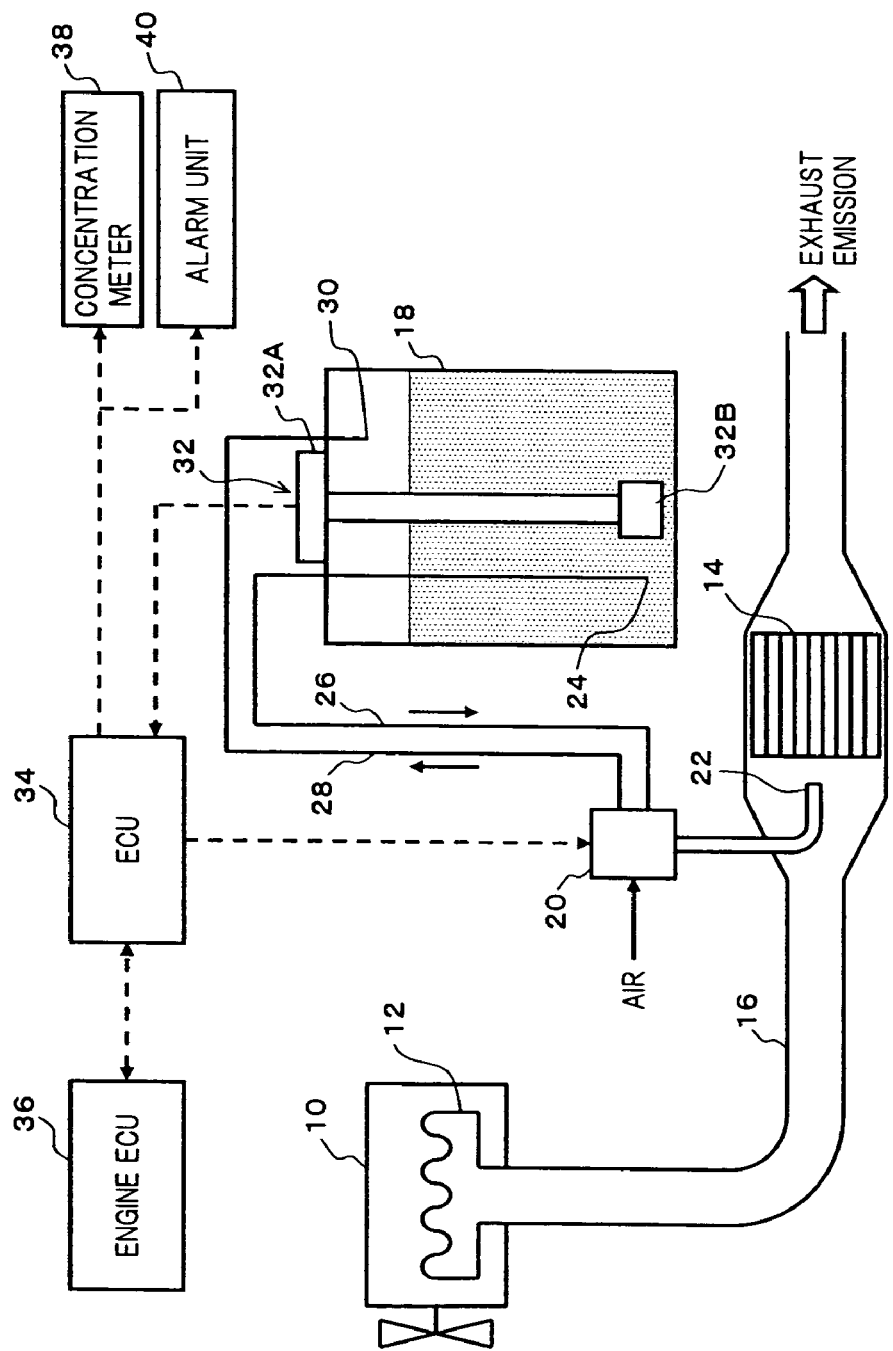

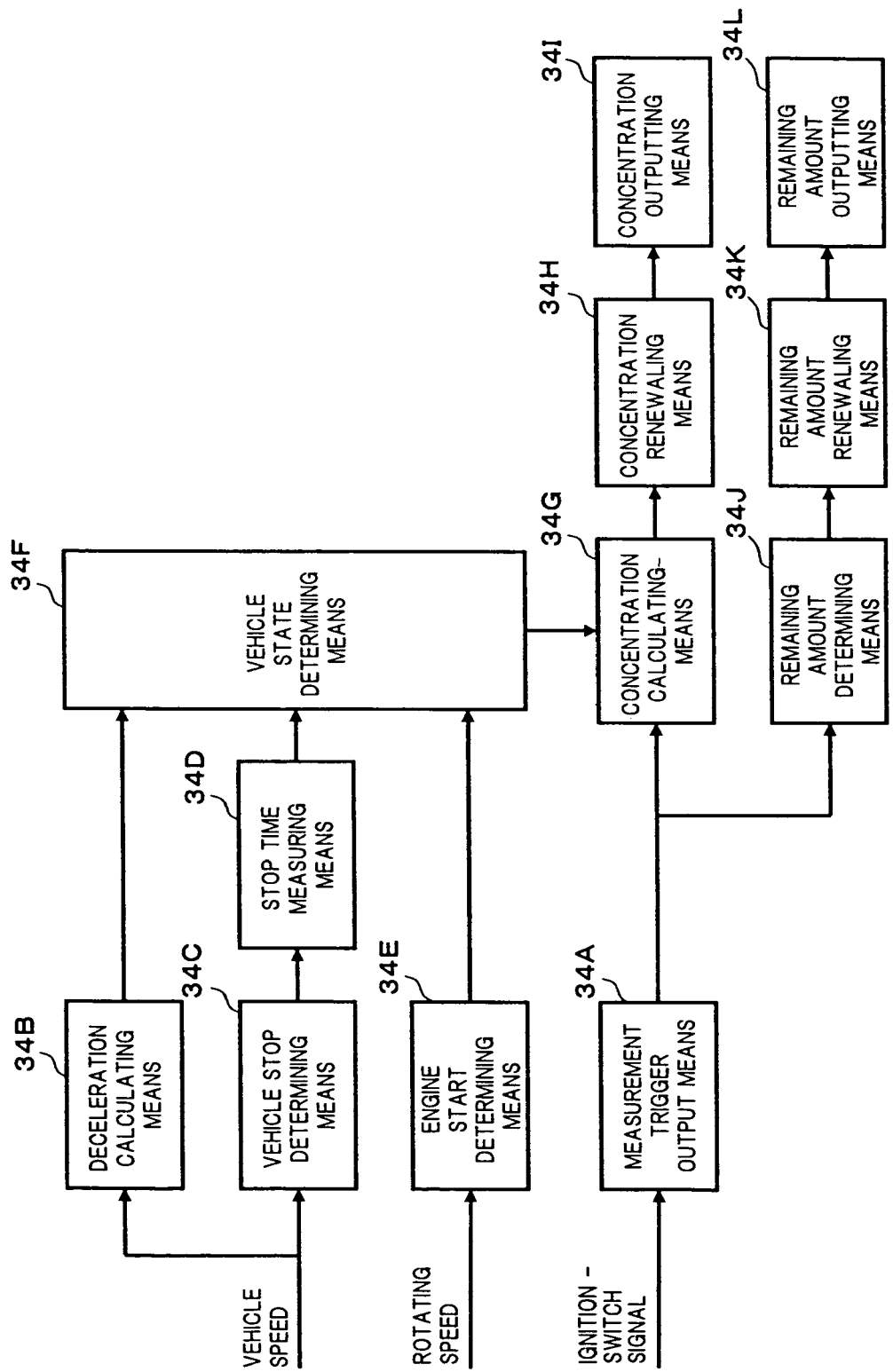

APPARATUS FOR DETECTING CONCENTRATION AND REMAINING AMOUNT OF LIQUID REDUCING AGENT

This application is a continuation of PCT/JP2004/012939, filed on Sep. 6, 2004.

BACKGROUND OF THE INVENTION

1. Field of the Invention

The present invention relates to a technique of ensuring a high detection accuracy of both a concentration and a remaining amount of a liquid reducing agent when a moving vehicle mounts thereon a sensor that outputs a signal related to the concentration and the remaining amount of the liquid reducing agent based on a heat transfer characteristics between two points distant apart from each other.

2. Description of the Related Art

As a catalyst purifying system for removing nitrogen oxides (NOx) included in engine exhaust emission, there is proposed an exhaust emission purifying apparatus disclosed in Japanese Unexamined Patent Publication No. 2000-27627 (JP-A-2000-27627). In this exhaust emission purifying apparatus, a reduction catalytic converter is disposed in an exhaust system of an engine and the reducing agent is injection-supplied to an exhaust emission at a position on an upstream side of the reduction catalytic converter thereby catalytically reduction-reacting NOx in the exhaust emission with the reducing agent to purify and turn NOx into harmless components. The reducing agent is stored in a liquid state at room temperature in a storage tank and is injection-supplied from an injection nozzle with a required amount depending on an operating state of the engine. For the reduction reaction, ammonia with satisfactory reactivity with NOx is used. As the reducing agent, a urea aqueous solution, which hydrolyze due to heat of exhaust emission and water vapor to easily generate ammonia, an ammonia aqueous solution, and other reducing agent aqueous solutions (hereinafter, referred to as "liquid reducing agents") are used.

However, in the above conventional exhaust emission purifying apparatus, when reduction reaction efficiency is changed as the concentration of the liquid reducing agent is varied and if the engine operation is continued without acknowledging this change, NOx reduction efficiency is decreased and the required NOx purifying performance may not be obtained. Especially, NOx may be emitted in a large amount if the engine operation is continued while a mixture ratio between the reducing agent and water both constituting the liquid reducing agent is inappropriate, a different kind of aqueous solution or water is mixed, or a remaining amount of the liquid reducing agent becomes insufficient.

Therefore, provision of a sensor for detecting a concentration and a remaining amount of the liquid reducing agent based on a heat transfer characteristic between two points distant apart from each other is conceivable. However, when this sensor is mounted on a moving vehicle such as an automobile, the following problem might occur. Namely, because a vehicle body constantly vibrates due to undulations of a road surface during driving of the mobile vehicle, the liquid reducing agent can be moved to cause a phenomenon of convection in the storage tank. When the convection of the liquid reducing agent occurs, the heat transfer characteristics through the agent which behaves as a heat transfer medium changes, and thus, the accuracy in detection of the concentration which is more sensitive to the change in the heat transfer characteristics than the remaining amount of the liquid reducing agent must decrease significantly.

SUMMARY OF THE INVENTION

Therefore, with the above problem of the prior art in view, it is an object of the present invention to provide an apparatus (hereinafter, referred to as a "detecting apparatus") for detecting a concentration and a remaining amount of a liquid reducing agent by calculating the concentration of the liquid reducing agent only when a vehicle state is stable without vibrating while determining the remaining amount of the liquid reducing agent irrespective of the vehicle state, to thereby ensure accuracy in detection of both the concentration and the remaining amount of the liquid reducing agent.

To achieve this object, according to the present invention, there is provided a detecting apparatus for detecting a concentration and a remaining amount of a liquid reducing agent, which comprises: a sensor disposed in a storage tank for storing a liquid reducing agent, to output a signal related to a concentration and a remaining amount of a liquid reducing agent based on a heat transfer characteristic between two points distant apart from each other; and a control unit which includes a built-in computer, wherein the control unit outputs a measurement trigger at every moment of a predetermined time interval after starting of an engine, determines that a vehicle state is stable when a stopping time for which a stationary state of a vehicle continuously lasts reaches a predetermined determination time period, calculates the concentration of the liquid reducing agent based on the signal from the sensor when the measurement trigger is output and also when it is determined that the vehicle state is stable, and determines the remaining amount of the liquid reducing agent based on the signal from the sensor when the measurement trigger is output.

Here, because the convection of the liquid reducing agent that occurs immediately after the stop of the vehicle is closely related to the deceleration, it is possible to determine the vehicle state with high accuracy by dynamically setting the determination time period depending on the deceleration of the vehicle.

It is also possible to successively sum up given points in response to the result of determination of the remaining amount of the liquid reducing agent based on the signal from the sensor and to determine that the liquid reducing agent has been used up when the sum of the points becomes equal to or greater than a predetermined value. In this way, even if it is determined that the remaining amount is reduced to "zero" based on the signal from the sensor, this determination is not immediately reflected on determination result of the remaining amount. Namely, the points are gradually added, and when the sum of the points becomes equal to or greater than the predetermined value, it is determined for the first time that the remaining amount reaches "zero". Therefore, even if noise or the like is superimposed on the signal from the sensor, erroneous determination can be avoided to thereby substantially increase the determination accuracy of the remaining amount of the liquid reducing agent. At this time point, the points may be written in a nonvolatile memory when the engine stops and then the points may be read out of the memory when the engine starts, so as to take over the points which are summed before the start of the engine. Therefore, it becomes unnecessary to renew the points from the start every time the engine is started and it is possible to determine the remaining amount of the liquid reducing agent with high accuracy even immediately after the start of the engine.

Furthermore, there may be provided a concentration data-storing unit for storing concentration data of the liquid reducing agent, which stores the concentration data of liquid reducing agent in a manner such that the stored concentration data can be renewed by a lately calculated concentration of liquid reducing agent. In this way, it is possible to refer to the concentration data of the liquid reducing agent at any time. A concentration indicating unit for visually indicating the stored concentration data of the liquid reducing agent or a first annunciating unit for giving a notice that the concentration deviates from a predetermined range when it happens may be provided. Hence, it is possible to maintain the concentration of the liquid reducing agent within the predetermined range by properly carrying out operations such as replenishing the storage tank with the liquid reducing agent, in response to the indication or the operation of giving a notice.

Moreover, there may be provided a remaining amount data-storing unit for storing data of the remaining amount of liquid reducing agent, which stores therein the data of the remaining amount of liquid reducing agent in a manner such that the stored data can be renewed by a determination result of the remaining amount of liquid reducing agent. In this way, it is possible to refer to the data of the remaining amount of the liquid reducing agent at any time. A second annunciating unit for giving a notice that the remaining amount of the liquid reducing agent becomes zero when it happens may be provided. Hence, it is possible to prevent continuation of the engine operation without liquid reducing agent by properly replenishing the storage tank with the liquid reducing agent in response to the operation of giving a notice.

With the present invention, if the stationary state of the vehicle lasts for the predetermined determination time after the vehicle has been stopped, it is determined that the vehicle state is stable. In other words, during driving or deceleration of the vehicle, acceleration acts in multiple directions on the liquid reducing agent in the storage tank to generate convection. However, when the vehicle stops, the convection in the liquid reducing agent gradually decreases with the elapse of time and finally disappears. Therefore, in addition to determining whether or not the vehicle is stopped, by determining whether or not the stopping state lasts for the determination time, it is possible to indirectly know that the convection has disappeared in the liquid reducing agent in the storage tank with high accuracy. When the measurement trigger is output and the vehicle state is stable, the concentration of the liquid reducing agent is calculated based on the signal from the sensor. On the other hand, every moment of time the measurement trigger is output, the remaining amount of the liquid reducing agent is determined based on the signal from the sensor.

Therefore, even if the sensor for outputting the signal related to the concentration and the remaining amount of the liquid reducing agent based on the heat transfer characteristics between two points distant apart from each other is mounted on the moving vehicle, the concentration is not calculated when the convection occurs in the liquid reducing agent. As a result, the signal, which may cause the erroneous detecting, is not reflected, to thereby ensure a high detection accuracy of both the concentration and the remaining amount.

BRIEF DESCRIPTION OF THE DRAWINGS

FIG. 1 is a block diagram of an exhaust emission purifying apparatus including a detecting apparatus according to the present invention;

FIGS. 2A and 2B show detail of a sensor wherein FIG. 2A is a detailed view of a detecting portion and FIG. 2B is an explanatory view of a principle of detecting;

FIG. 3 is a block diagram of various functions forming the detecting apparatus;

DESCRIPTION OF THE PREFERRED EMBODIMENTS

Figure 2A:
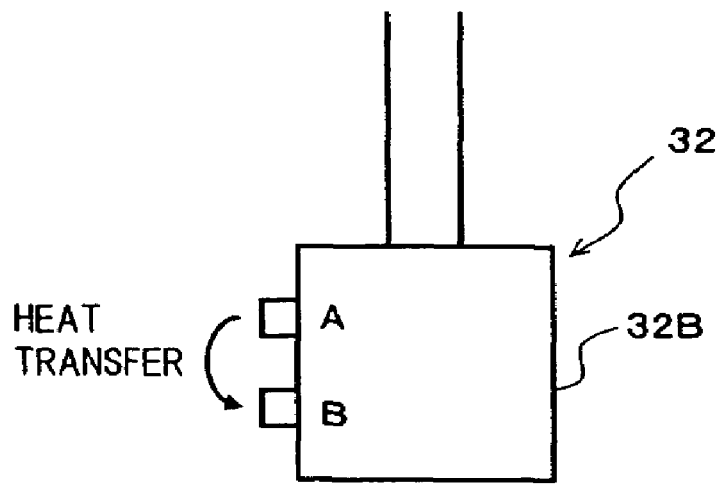

The present invention will specifically be described hereinbelow with reference to the accompanying drawings.

FIG. 1 shows a structure of an exhaust emission purifying apparatus including a detecting apparatus according to the present invention.

Exhaust emission of an engine 10 is emitted into the atmosphere from an exhaust manifold 12 through an exhaust pipe 16 in which a NOx reduction catalytic converter 14 is disposed. Specifically, in the exhaust pipe 16, three catalytic converters, i.e., a nitrogen monoxide (NO) oxidization catalytic converter, a NOx reduction catalytic converter, and an ammonia slip oxidization catalytic converter, are disposed in order from an exhaust emission upstream side, and a temperature sensor, an oxygen sensor and the like are disposed in front and at the rear of the converters, which form an exhaust system. However, details are not illustrated. On the exhaust emission upstream side of the NOx reduction catalytic converter 14, a liquid reducing agent stored in a storage tank 18 is injection-supplied together with air through a reducing agent-supplying device 20 and an injection nozzle 22. Here, although a urea aqueous solution is used as the reducing agent in the present embodiment, an ammonia aqueous solution, and diesel oil, petroleum or gasoline having hydrocarbon as a main component may also be used.

The urea aqueous solution, which is an aqueous solution including dissolved solid or powder urea, is drawn from an inlet port 24 opening in a vicinity of a bottom portion of the storage tank 18, and supplied to the reducing agent-supplying device 20 via supply piping 26. Here, out of the urea aqueous solution supplied to the reducing agent-supplying device 20, surplus solution, which is not injected, is returned into the storage tank 18 through return piping 28 via a return port 30 opening in an upper position of the storage tank 18.

The urea aqueous solution injection-supplied on the exhaust emission upstream side of the NOx reduction catalytic converter 14 is hydrolyzed due to heat of the exhaust emission and water vapor in the exhaust emission to easily generate ammonia. It is known that generated ammonia reacts with NOx in the exhaust emission in the NOx reduction catalytic converter 14, and NOx is purified and turned into water and harmless gas.

A sensor 32 for outputting a signal related to a concentration and a remaining amount of the urea aqueous solution is mounted on the storage tank 18. In other words, a base portion 32A in which a circuit board is accommodated therein is fixed to a top wall of the storage tank 18 and a detecting portion 32B extends down from the base portion 32A toward the bottom portion of the storage tank 18.

Here, as the detecting portion 32B, as shown in FIG. 2A, a heating heater A and a temperature sensor B are disposed respectively in two positions distant apart from each other.

Figure 2B:
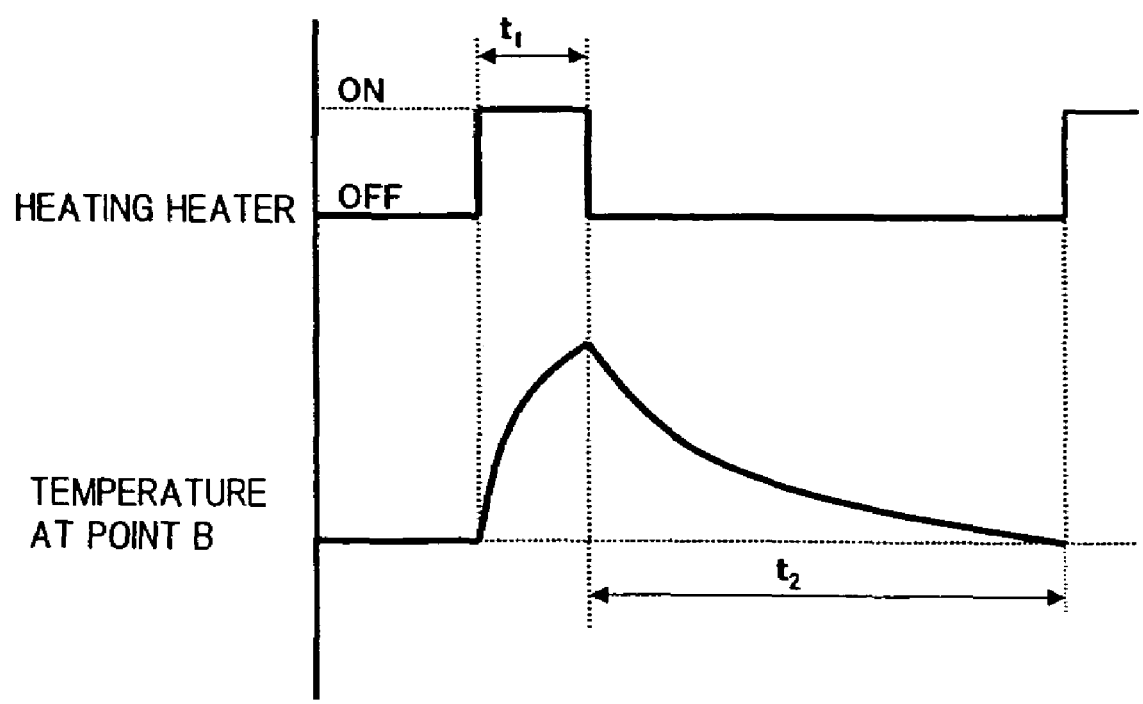

When the heating heater A is heated, through a heat characteristics of transfer with which the heat is transmitted to the temperature sensor B, the signal related to the concentration and the remaining amount of the urea aqueous solution is output. More specifically, as shown in FIG. 2B, if the heating heater A is energized for a predetermined time $t_1$, a temperature gradually increases at the temperature sensor B with the characteristics according to a thermal conductivity of the urea aqueous solution. According to temperature-rising characteristics when the heating heater is stopped, i.e., according to a difference between an initial temperature and a peak temperature at the temperature sensor B, the concentration and the remaining amount of the urea aqueous solution can be detected. On the other hand, after the heating heater A is stopped, the temperature at the temperature sensor B gradually decreases and returns to the temperature before energization of the heating heater, which requires time $t_2$. Therefore, it is possible to detect the concentration and the remaining amount of the urea aqueous solution every moment of a predetermined time interval $(t_1+t_2)$. As the sensor 32, there is a known sensor manufactured and marketed by MITSUI MINING & SMELTING CO., LTD in Japan.

The output signal of the sensor 32 is delivered as an input to a control unit 34 which is provided with a built-in computer. To the control unit 34, an engine rotating speed signal, an ignition switch signal, a vehicle speed signal, and the like are input through a CAN (Controller Area Network) from an engine control unit 36 for carrying out various controls of the engine 10. In the control unit 34, by control programs stored in ROM (Read Only Memory), as shown in FIG. 3, measurement trigger output means 34A, deceleration calculating means 34B, vehicle stop determining means 34C, stop time measuring means 34D, engine-start determining means 34E, vehicle-state determining means 34F, concentration calculating means 34G, concentration renewal means 34H, concentration outputting means 34I, remaining amount determining means 34J, remaining amount renewal means 34K, and remaining amount outputting means 34L are implemented, respectively.

The measurement trigger output means 34A is started when the ignition switch signal is turned ON, and outputs a measurement trigger indicating that detecting of the concentration and the remaining amount of the urea aqueous solution should be started every predetermined time $(t_1+t_2)$ shown in FIG. 2B. The deceleration calculating means 34B calculates deceleration from a rate of change of the vehicle speed. The vehicle stop determining means 34C determines whether or not the vehicle has stopped based on the vehicle speed. The stop time measuring means 34D measures a stop time for which the vehicle is continuously in a stationary state when the vehicle stop determining means 34C determines that the vehicle has stopped. The engine start determining means 34E determines whether or not the engine 10 has started based on the engine rotating speed. The vehicle-state determining means 34F determines the vehicle state based on the deceleration calculated by the deceleration calculating means 34B, the stop time measured by the stop time measuring means 34D, and determination result by the engine-start determining means 34E. Here, the "vehicle state" refers to whether or not the vehicle is stable and concretely, whether convection is generated (unstable) or not generated (stable) in the urea aqueous solution in the storage tank 18.

The concentration calculating means 34G calculates the concentration of the urea aqueous solution based on the signal from the sensor 32 when the measurement trigger is output from the measurement trigger output means 34A and the vehicle-state determining means 34F determines that the vehicle state is stable. The concentration renewing means 34H renews the concentration data of the urea aqueous solution stored in memory as a concentration data-storing device to the concentration of the urea aqueous solution calculated by the concentration calculating means 34G. The concentration outputting means 34I functions as a concentration indicating unit by collaboration of a concentration meter 38 and outputs an actuation signal to the concentration meter 38 so as to visually indicate the concentration of the urea aqueous solution stored in the memory. The remaining amount determining means 34J determines the remaining amount (presence or absence) of the urea aqueous solution based on the signal from the sensor 32 when the measurement trigger is output from the measurement trigger output means 34A. The remaining amount renewing means 34K renews the data indicating the remaining amount of the urea aqueous solution stored in the memory as remaining amount data-storing unit based on a determination result by the remaining amount determining means 34J. The remaining amount outputting means 34L functions as a second annunciating unit by collaboration of an alarm unit 40 and outputs an actuation signal to the alarm unit 40 so as to give a notice that the remaining amount of the urea aqueous solution stored in the memory becomes zero (absent) when it happens.

Next, operation of the detecting apparatus will be described with reference to flow charts in FIGS. 4 through 8.

Figure 4:
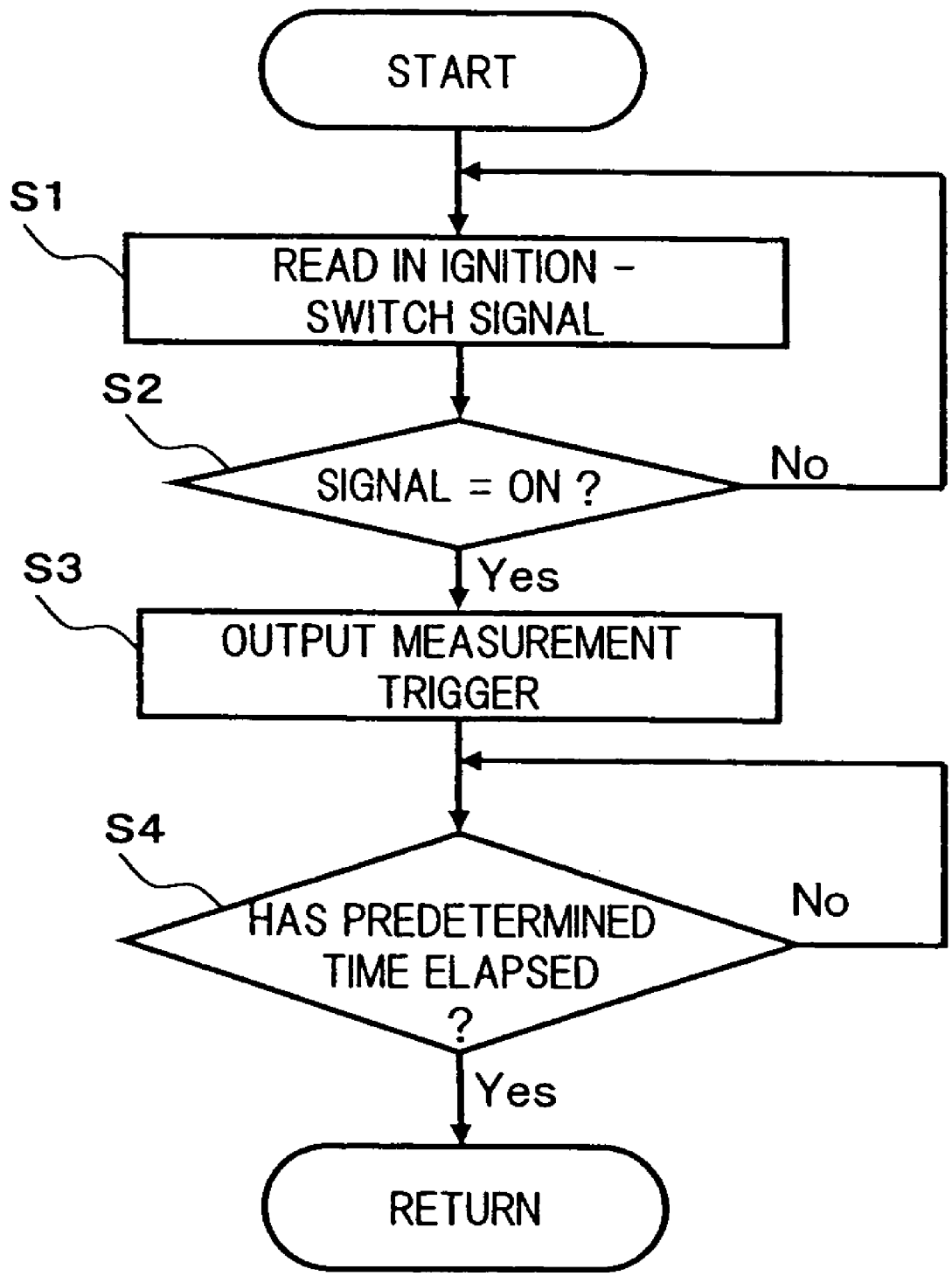
FIG. 4 is a flow chart showing measurement trigger output processing.

In FIG. 4 showing the measurement trigger output processing by the measurement trigger outputting means 34A, at step 1 (abbreviated as "S1" in the drawing. Hereinafter, the same shall be applied), the ignition switch signal is read in from the engine control unit 36 via the CAN.

At step 2, whether or not the ignition-switch signal is ON, i.e., whether or not the engine 10 has started is determined. If the ignition-switch signal is ON, the processing goes to step 3 (Yes). On the other hand, if the ignition-switch signal is OFF, the processing returns to step 1 (No).

At step 3, the measurement trigger is output.

At step 4, whether or not the predetermined time $(t_1+t_2)$ has elapsed since the measurement trigger was output is determined. If the predetermined time has elapsed since the measurement trigger was output, the processing is finished (Yes). On the other hand, if the predetermined time has not elapsed, the processing is on standby (No).

With such measurement trigger output processing, after the engine 10 has started, the measurement trigger is output every moment of the predetermined time interval $(t_1+t_2)$. Therefore, by monitoring presence or absence of the measurement trigger, it is possible to know whether or not detecting of the concentration and the remaining amount of the urea aqueous solution by the sensor 32 has become possible.

Figure 5:
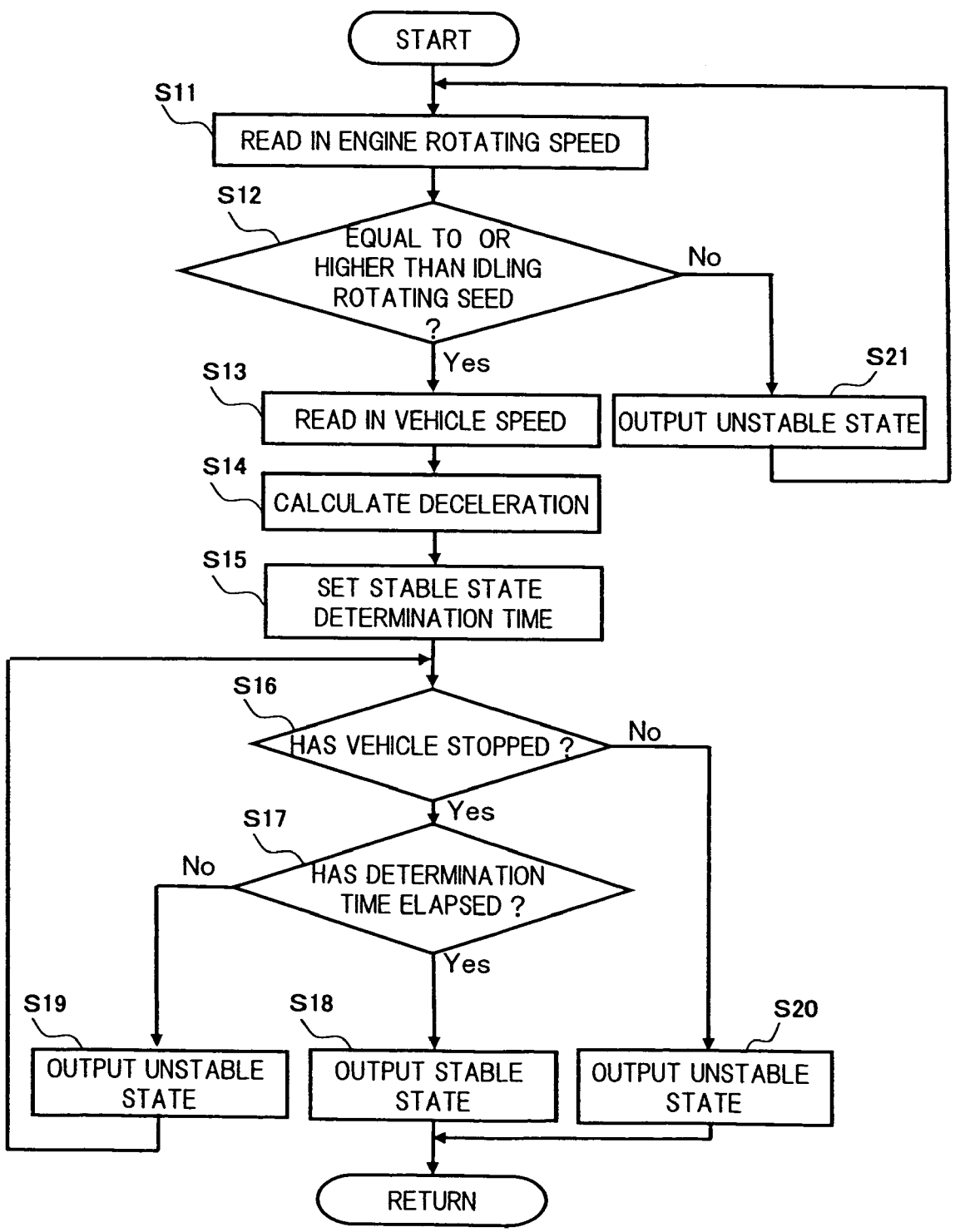
FIG. 5 is a flow chart showing vehicle state determining processing.

In FIG. 5 showing a determining processing of the vehicle state conducted by the deceleration calculating means 34B, the vehicle-stopping determining means 34C, the stopping-time measuring means 34D, the engine-start determining means 34E, and the vehicle-state determining means 34F, at step 11, the engine rotating speed signal is read in from the engine control unit 36 via the CAN.

At step 12, whether the engine rotating speed is equal to or higher than an idling rotating speed, i.e., whether or not the engine 10 has started is determined. If the engine rotating speed is equal to or higher than the idle rotating speed, the processing goes to step 13 (Yes). On the other hand, if the engine rotating speed is lower than the idle rotating speed, the processing goes to step 21 (No), and a signal indicating that the vehicle is in an unstable state is output. Here, the signal indicating the vehicle state is output to a predetermined area of the memory so that the signal can be referred to an arbitrary time point.

At step 13, via the CAN, the vehicle speed signal is read in from the engine control unit 36.

At step 14, the deceleration is calculated from the rate of change in the vehicle speed.

At step 15, a determination time for conducting determination of the vehicle stable state based on the deceleration is set dynamically.

At step 16, whether or not the vehicle has stopped is determined based on the vehicle speed. Here, the concept that "the vehicle has stopped" is not limited to the state in which the vehicle has completely stopped but also includes a substantial stop state in which the convection in the urea aqueous solution within the storage tank 18 gradually reduces. If the vehicle has stopped, the processing goes to step 17 (Yes). On the other hand, if the vehicle has not stopped, the processing goes to step 20 (No) and a signal indicating that the vehicle is in an unstable state is output.

At step 17, whether or not the determination time has elapsed since the vehicle stopped, i.e., whether or not the stop state of the vehicle has lasted for the determination time is determined. If the determination time has elapsed since the vehicle stopped, the processing goes to step 18 (Yes) and the signal indicating that the vehicle is in the stable state is output. On the other hand, if the determination time has not elapsed since the vehicle stopped, the processing goes to step 19 (No) and the signal indicating that the vehicle is in the unstable state is output.

With this vehicle state determining processing, if the stop state of the vehicle has lasted for the determination time after the vehicle stopped, the signal indicating that the vehicle is in the stable state is output. In other words, during driving or deceleration of the vehicle, acceleration acts in multiple directions on the urea aqueous solution within the storage tank 18 to generate convective motion in the urea aqueous solution. However, if the vehicle stops, the convective motion in the urea aqueous solution gradually reduces with the elapse of time and finally disappears. Therefore, in addition to determining whether or not the vehicle has stopped, by determining whether or not the stop state has lasted for the determination time, it is possible to indirectly know that the convection has disappeared in the urea aqueous solution in the storage tank 18 with high accuracy. At this time, because the convection in the urea aqueous solution immediately after the stop of the vehicle is closely related to the deceleration, it is possible to carry out determination with high accuracy by dynamically setting the determination time according to the deceleration.

Figure 6:
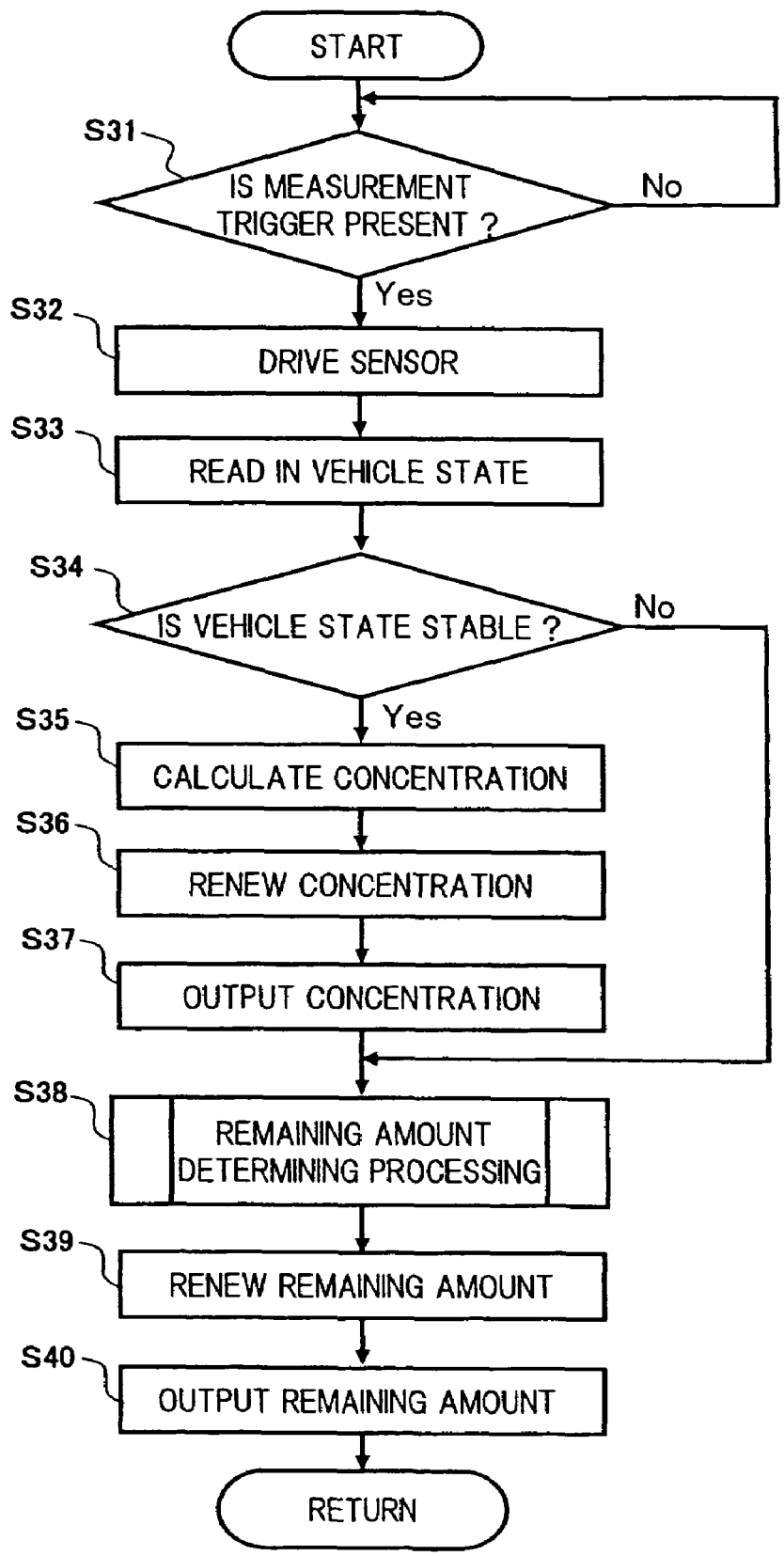
FIG. 6 is a flow chart showing renewal processing of data of a concentration and a remaining amount of a urea aqueous solution.

In FIG. 6 showing the processing of renewing the concentration and the remaining amount of the urea aqueous solution by the concentration calculating means 34G, the concentration renewing means 34H, the concentration outputting means 34I, the remaining amount determining means 34J, the remaining amount renewing means 34K, and the remaining amount output means 34L, at step 31, whether or not the measurement trigger has been output is determined. If the measurement trigger has been output, the processing goes to step 32 (Yes). On the other hand, if the measurement trigger has not been output, the processing is on standby (No).

At step 32, so as to start detecting of the concentration and the remaining amount of the urea aqueous solution, the heating heater A of the sensor 32 is actuated only for the predetermined time $t_1$.

At step 33, a signal indicating the vehicle state, i.e., whether the vehicle is in the stable state or the unstable state is read in from the memory.

At step 34, whether or not the vehicle is in the stable state is determined. If the vehicle is in the stable state, the processing goes to step 35 (Yes). If the vehicle is in the unstable state, the processing goes to step 38 (No).

At step 35, the concentration of the urea aqueous solution is calculated based on the temperature-rising characteristic in the temperature sensor B when the heating heater A of the sensor 32 is energized.

At step 36, the concentration of the urea aqueous solution stored in the memory is renewed to the calculated concentration of the urea aqueous solution.

At step 37, so as to visually indicate the concentration of the urea aqueous solution stored in the memory, a concentration signal is output to the concentration meter 38. Here, when the concentration of the urea aqueous solution deviates from a predetermined range, the alarm unit 40 may be actuated so as to give a notice of a possibility that required NOx purifying efficiency cannot be obtained. By the alarm unit 40 and a control for actuating the unit 40, a first annunciating unit is implemented.

Figure 7:
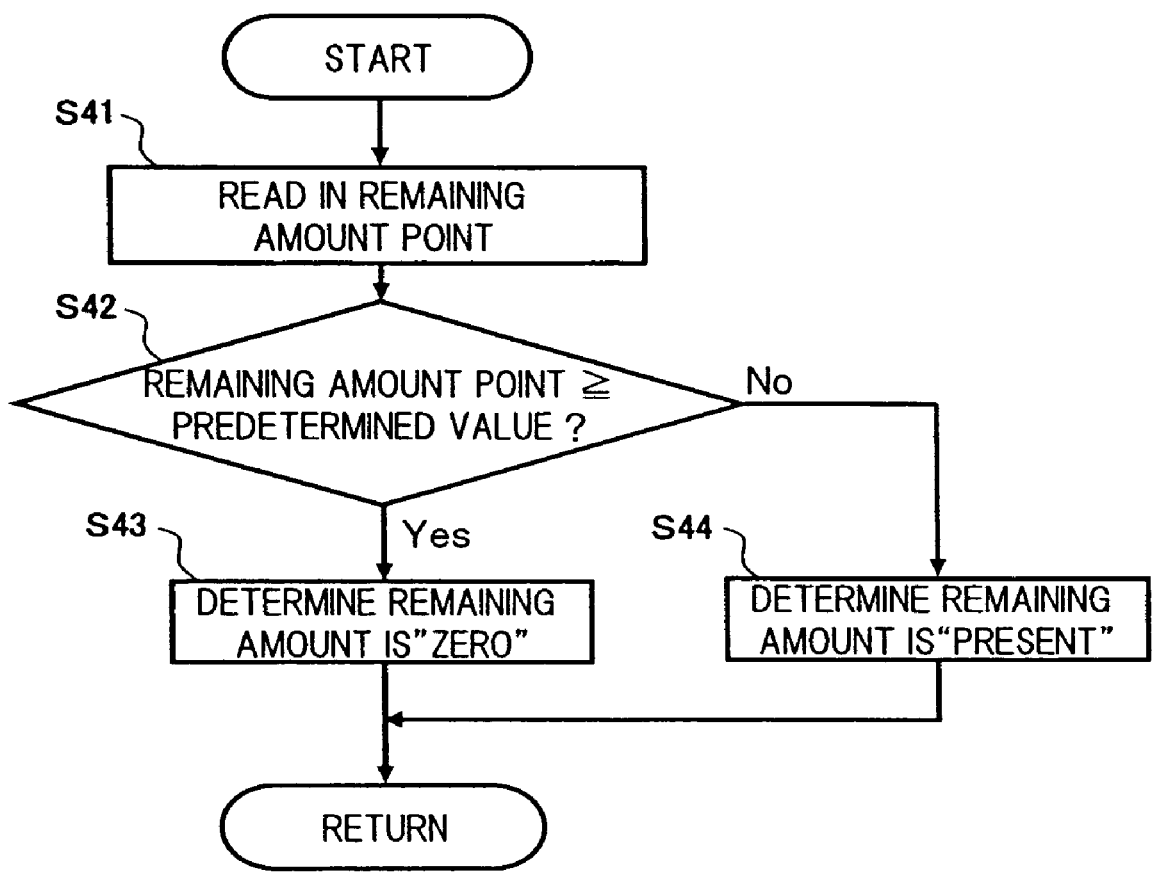
FIG. 7 is a flow chart showing remaining amount-determining processing.

At step 38, a subroutine for performing the remaining amount determining processing shown in FIG. 7 is called so as to determine the remaining amount of the urea aqueous solution in the storage tank 18, i.e., whether or not the urea aqueous solution has been used up.

At step 39, the remaining amount of the urea aqueous solution stored in the memory is renewed based on the determination result of the remaining amount of the urea aqueous solution.

At step 40, when the urea aqueous solution is used up, the alarm unit 40 is actuated so as to give a notice that the urea aqueous solution should be supplied.

In FIG. 7 showing the subroutine for performing the remaining amount determining processing, at step 41, a remaining amount point stored in the memory is read in. The "remaining amount point" refers to a threshold value for increasing accuracy of detecting of the remaining amount of the urea aqueous solution in the storage tank 18 in consideration of a possibility that detecting of the remaining amount is not carried out normally due to superimposition of noise or the like on the signal from the sensor 32, and the remaining amount point is stored in the memory.

At step 42, whether or not the remaining amount point is equal to or greater than a predetermined value is determined. If the remaining amount point is equal to or greater than the predetermined value, the processing goes to step 43 (Yes) and it is determined that the remaining amount reaches "zero". On the other hand, if the remaining amount point is lower than the predetermined value, the processing goes to step 44 (No) and it is determined that the remaining amount is still "present".

Figure 8:
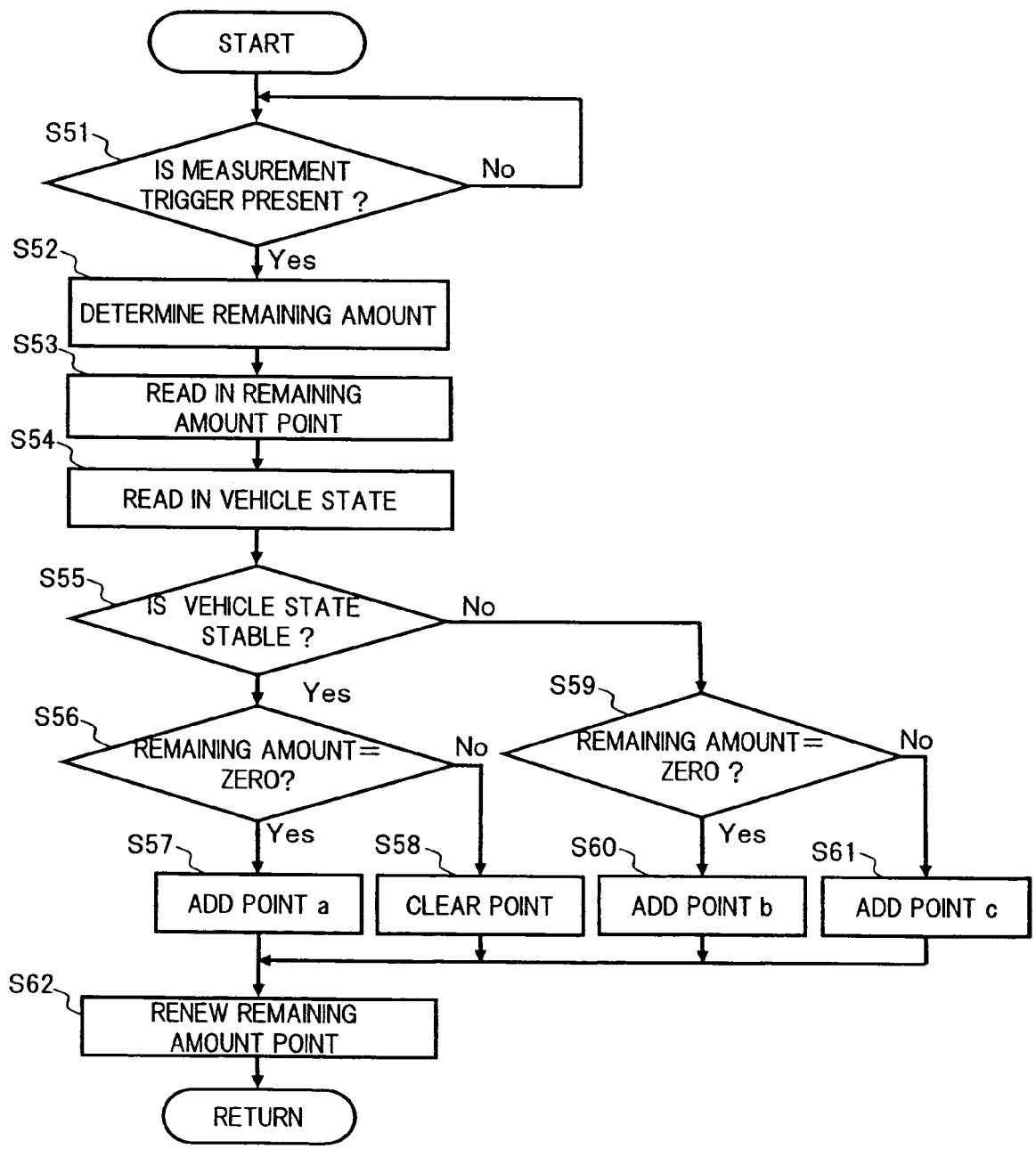
FIG. 8 is a flow chart showing remaining amount point renewal processing.

Here, a renewal of the remaining amount point is performed by processing shown in FIG. 8.

At step 51, whether or not the measurement trigger has been output is determined. If the measurement trigger has been output, the processing goes to step 52 (Yes). On the other hand, if the measurement trigger has not been output, the processing is on standby (No).

At step 52, based on the temperature-rising characteristic in the temperature sensor B when the heating heater A of the sensor 32 is energized, the remaining amount of the urea aqueous solution in the storage tank 18, i.e., whether or not the urea aqueous solution has been used up, is determined.

At step 53, the remaining amount point is read in from the memory.

At step 54, the vehicle state is read in from the memory.

As step 55, whether or not the vehicle is in the stable state is determined. If the vehicle is in the stable state, the processing goes to step 56 (Yes). If the vehicle is in the unstable state, the processing goes to step 59 (No).

At step 56, a branch processing according to the remaining amount of the urea aqueous solution is performed. If the urea aqueous solution has been used up, the processing goes to step 57 (Yes) and a point "a" as a predetermined value is added to the remaining amount point. On the other hand, if the urea aqueous solution has not been used up, the processing goes to step 58 (No) and the remaining amount point is cleared.

At step 59, another branch processing according to the remaining amount of the urea aqueous solution is performed. If the urea aqueous solution has been used up, the processing goes to step 60 (Yes) and a point "b" as a predetermined value is added to the remaining amount point. On the other hand, if the urea aqueous solution has not been used up, the processing goes to step 61 (No) and a point "c" as a predetermined value is added to the remaining amount point.

At step 62, the remaining amount point stored in the memory is renewed to the renewed remaining amount point.

With the renewing processing of the concentration and the remaining amount of the urea aqueous solution, every moment of time the measurement trigger is output, the heating heater A of the sensor 32 is actuated for the predetermined time $t_1$. Then, when the vehicle is in the stable state, the concentration of the urea aqueous solution is calculated based on the temperature-rising characteristic in the temperature sensor B, the concentration data of the urea aqueous solution in the memory is renewed, and the concentration data of the urea aqueous solution in the memory is indicated on the concentration meter 38. Therefore, because the concentration of the urea aqueous solution is renewed only when the vehicle is in the stable state, i.e., when the convection is not generated in the urea aqueous solution, it is possible to reliably prevent reduction in detection accuracy of the concentration of the urea aqueous solution due to the convection. When deviation of the concentration of the urea aqueous solution indicated on the concentration meter 38 from the predetermined range is noticed or when the alarm unit 40 is actuated, operation such as replenishing of the storage tank 18 with the urea aqueous solution is performed to thereby retain the concentration of the urea aqueous solution in the predetermined range and maintain the required NOx purifying efficiency.

Although the sensor 32 has a characteristic of avoiding erroneous detection of the remaining amount even when the convective motion is generated in the urea aqueous solution, there are possibilities that noise or the like is superimposed on the signal from the sensor 32 and that the remaining amount is erroneously detected. However, even if it is determined that the remaining amount reaches "zero" based on the signal from the sensor 32, this is not reflected as it is in the determination result of the remaining amount but the remaining amount points are gradually added. When the sum becomes equal to or greater than the predetermined value, it is determined for the first time that the remaining amount reaches "zero". Therefore, the determination accuracy of the remaining amount of the urea aqueous solution indispensable for purifying of NOx in the NOx reduction catalytic converter 14 is increased substantially. It is possible to prevent the exhaust emission in which NOx has not been purified yet from being exhausted as it is when it is determined that the remaining amount is "present" while the remaining amount actually reaches "zero" and the engine operation is continued, for example.

Moreover, because the alarm unit 40 is actuated when the remaining amount of the urea aqueous solution in the storage tank 18 becomes "zero", a driver or the like can recognize that the urea aqueous solution should be supplied. Then, by properly replenishing the storage tank 18 with the urea aqueous solution in response to the notice, it is possible to prevent continuation of the engine operation without urea aqueous solution.

While the remaining amount point in the memory is written in EEPROM (Electrically Erasable Programmable Read Only Memory) or the like as nonvolatile memory when the engine 10 is stopped, the remaining amount point written in the EEPROM or the like may be read out to the memory when the engine 10 is started. In this way, because the remaining amount point before the start of the engine 10 is taken over, it becomes unnecessary to renew the remaining amount point from the start every time the engine 10 is started. Therefore, it is possible to determine the remaining amount of the urea aqueous solution with high accuracy even immediately after the start of the engine 10.

Therefore, with the detecting apparatus according to the invention, even if the sensor for outputting the signal related to the concentration and the remaining amount of the liquid reducing agent based on the heat transfer characteristics between two points distant apart from each other is mounted on the moving vehicle, the signal which may cause the erroneous detecting is not reflected to thereby ensure a high detection accuracy of both the concentration and the remaining amount. Therefore, it is possible to suppress engine operation with improper concentration of the liquid reducing agent or without the liquid reducing agent to thereby maintain satisfactory NOx purifying efficiency.

As described above, with the detecting apparatus according to the invention, while the concentration of the liquid reducing agent is calculated only when the vehicle is in the stable state, the remaining amount of the liquid reducing agent is determined irrespective of the vehicle state. Therefore, even if the sensor for outputting the signal related to the concentration and the remaining amount of the liquid reducing agent based on the heat transfer characteristics between two points distant apart from each other is mounted on the moving vehicle, a high detection accuracy of both the concentration and the remaining amount of the liquid reducing agent can be ensured and the apparatus can be of significant utility.

We claim:

1. An apparatus for detecting a concentration and a remaining amount of a liquid reducing agent comprising:

a sensing unit disposed in a storage tank that stores a liquid reducing agent for outputting a signal in relation to a concentration and a remaining amount of the liquid reducing agent based on a heat transfer characteristic between two points distant apart from each other; and a control unit that includes therein a built-in computer, wherein the control unit performs:

outputting a measurement trigger at every moment of a predetermined time interval after starting of an engine;

determining that a vehicle state is stable when a stop time for which a vehicle is continuously in a stationary state reaches the set determination time;

calculating the concentration of the liquid reducing agent based on the signal from the sensing unit when the measurement trigger is output and when it is determined that the vehicle state is stable; and determining the remaining amount of the liquid reducing agent when the measurement trigger is output, based on the signal from the sensing unit, wherein the control unit calculates a deceleration of the vehicle and sets the determination time on the basis of the deceleration which was calculated.

2. An apparatus for detecting a concentration and a remaining amount of a liquid reducing agent comprising:

a sensing unit disposed in a storage tank that stores a liquid reducing agent for outputting a signal in relation to a concentration and a remaining amount of the liquid reducing agent based on a heat transfer characteristic between two points distant apart from each other; and a control unit that includes therein a built-in computer.

wherein the control unit performs:

outputting a measurement trigger at every moment of a predetermined time interval after starting of an engine;

determining that a vehicle state is stable when a stop time for which a vehicle is continuously in a stationary state reaches a predetermined determination time;

calculating the concentration of the liquid reducing agent based on the signal from the sensing unit when the measurement trigger is output and when it is determined that the vehicle state is stable; and determining the remaining amount of the liquid reducing agent when the measurement trigger is output, based on the signal from the sensing unit, wherein the control unit successively sums up given points corresponding to results of determination of the remaining amount of the liquid reducing agent that was made based on the signal from the sensing unit; and determines that the liquid reducing agent has been used up when the sum of the points becomes equal to or greater than a predetermined value.

3. The apparatus for detecting the concentration and the remaining amount of the liquid reducing agent according to claim 2, wherein the control unit writes the points in a non-volatile memory when the engine stops while reading the points out of the memory when the engine is started.

4. An apparatus for detecting a concentration and a remaining amount of a liquid reducing agent comprising:

a sensing unit disposed in a storage tank that stores a liquid reducing agent for outputting a signal in relation to a concentration and a remaining amount of the liquid reducing agent based on a heat transfer characteristic between two points distant apart from each other;

a concentration data-storing unit that stores data of the concentration of the liquid reducing agent; and a control unit that includes therein a built-in computer, wherein the control unit performs:

outputting a measurement trigger at every moment of a predetermined time interval after starting of an engine;

determining that a vehicle state is stable when a stop time for which a vehicle is continuously in a stationary state reaches a predetermined determination time;

calculating the concentration of the liquid reducing agent based on the signal from the sensing unit when the measurement trigger is output and when it is determined that the vehicle state is stable; and determining the remaining amount of the liquid reducing agent when the measurement trigger is output, based on the signal from the sensing unit, wherein the control unit is configured to renew the data of the concentration of the liquid reducing agent stored in the concentration data-storing unit by the calculated concentration of the liquid reducing agent.

5. The apparatus for detecting the concentration and the remaining amount of the liquid reducing agent according to claim 4, further comprising a concentration indicating unit that visually indicates the concentration of the liquid reducing agent stored in the concentration data-storing unit.

6. The apparatus for detecting the concentration and the remaining amount of the liquid reducing agent according to claim 4, further comprising a first annunciating unit that provides a notice that the concentration of the liquid reducing agent stored in the concentration data-storing unit deviates from a predetermined range when such a deviation occurs.

7. An apparatus for detecting a concentration and a remaining amount of a liquid reducing agent comprising:

a sensing unit disposed in a storage tank that stores a liquid reducing agent for outputting a signal in relation to a concentration and a remaining amount of the liquid reducing agent based on a heat transfer characteristic between two points distant apart from each other;

a remaining amount data-storing unit that stores data of the remaining amount of the liquid reducing agent; and a control unit that includes therein a built-in computer, wherein the control unit performs:

outputting a measurement trigger at every moment of a predetermined time interval after starting of an engine;

determining that a vehicle state is stable when a stop time for which a vehicle is continuously in a stationary state reaches a predetermined determination time;

calculating the concentration of the liquid reducing agent based on the signal from the sensing unit when the measurement trigger is output and when it is determined that the vehicle state is stable; and determining the remaining amount of the liquid reducing agent when the measurement trigger is output, based on the signal from the sensing unit, wherein the control unit renews the data of the remaining amount of the liquid reducing agent stored in the remaining amount data-storing unit according to a determination result of the remaining amount of the liquid reducing agent.

8. The apparatus for detecting the concentration and the remaining amount of the liquid reducing agent according to claim 7, further comprising an annunciating unit that provides a notice that the remaining amount of the liquid reducing agent stored in the remaining amount data-storing unit becomes substantially void when such void amount of the liquid reducing agent occurs.

* * * * *